United States Patent [19]
Van Gompel

[11] 3,765,716
[45] Oct. 16, 1973

[54] ENTENSIBLE TOP FOR OPEN VEHICLE BODY

[75] Inventor: James J. Van Gompel, Fremont, Ind.

[73] Assignee: Brammall, Inc., Angola, Ind.

[22] Filed: Mar. 27, 1972

[21] Appl. No.: 238,254

[52] U.S. Cl. ............................................. 296/137 B
[51] Int. Cl. ............................................... B60j 7/08
[58] Field of Search .................... 296/137 B, 27, 26; 74/520

[56] References Cited
UNITED STATES PATENTS
| | | | |
|---|---|---|---|
| 3,649,073 | 3/1972 | Whittemore | 296/137 B |
| 3,377,100 | 4/1968 | Cripe | 296/137 B |
| 3,689,018 | 9/1972 | Pelle | 74/520 |

Primary Examiner—Robert R. Song
Attorney—Harold B. Hood et al.

[57] ABSTRACT

A vehicle, such as a pickup truck, having an open body and a top movable between an upper position spaced above the body and a lower position forming an enclosure therewith. A pair of spaced extensible mechanisms respectively interconnect the body and top. Each of the mechanisms comprises a pair of spaced toggle linkages each having four link elements pivotally connected together at first and second opposite pivot points and at a third and fourth opposite pivot points to form a parallelogram, the first pivot points being connected to the top and the second pivot points being connected to the body. The third pivot points are interconnected for movement in unison on an axis and the fourth pivot points are guided for movement on the axis.

4 Claims, 10 Drawing Figures

Patented Oct. 16, 1973
3,765,716
4 Sheets-Sheet 3
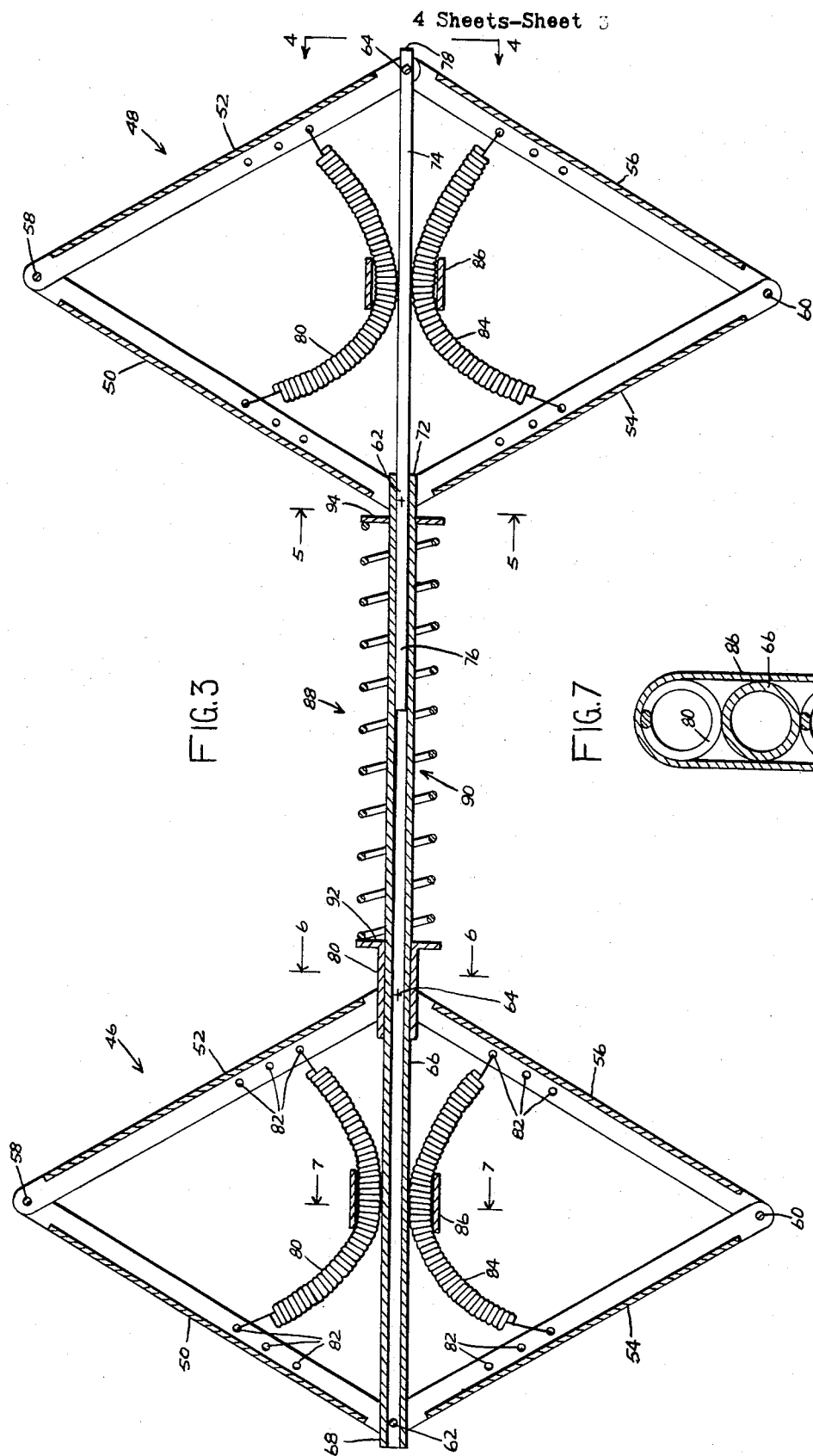
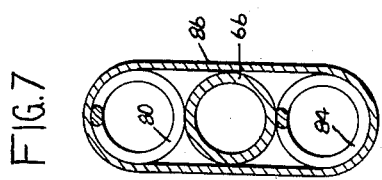

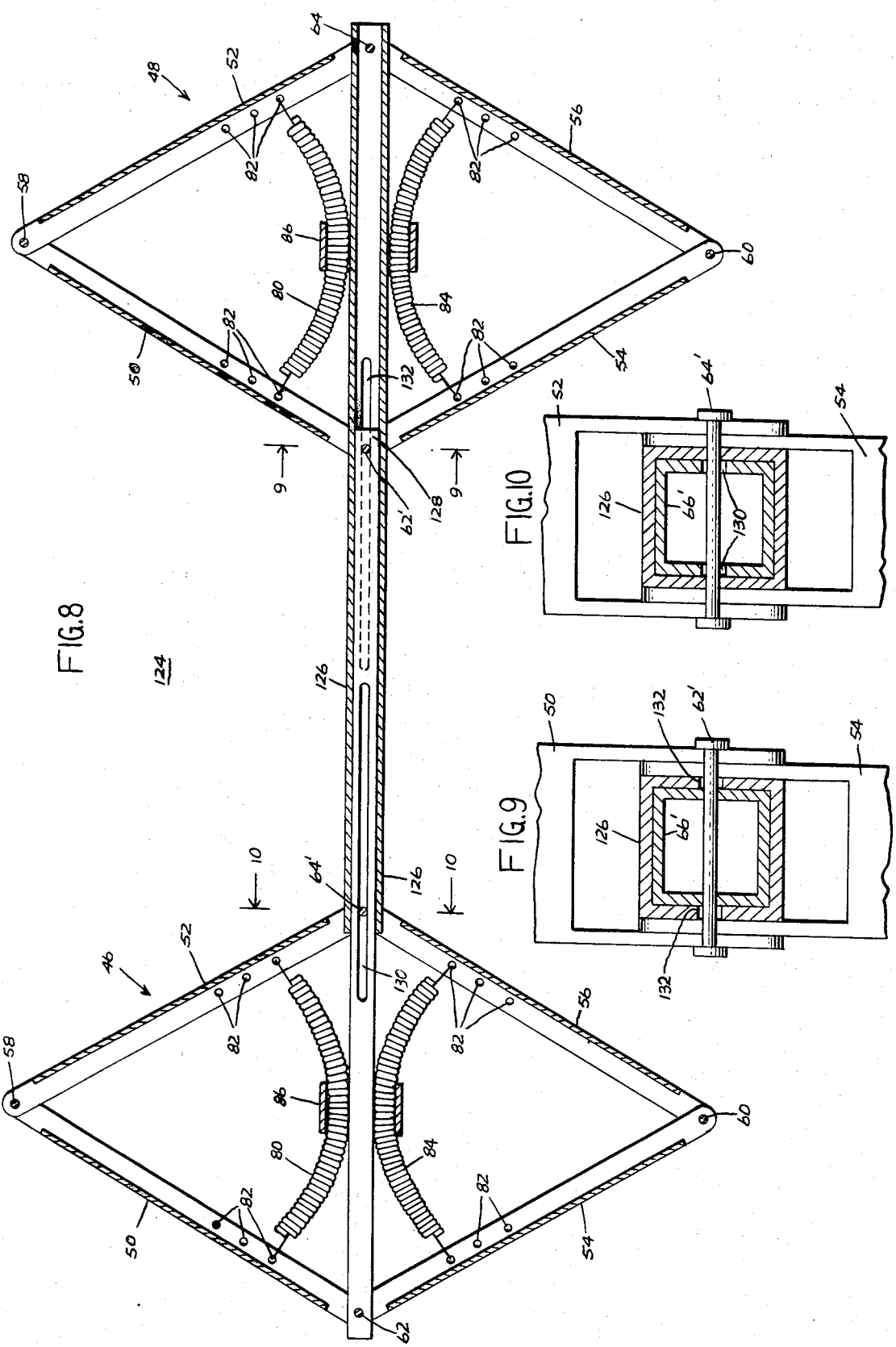

3,765,716

EXTENSIBLE TOP FOR OPEN VEHICLE BODY

BACKGROUND OF THE INVENTION

1. Field of The Invention

This invention relates generally to vehicles having an open body with a movable top therefor, and to an extensible mechanism therefor.

2. Description of The Prior Art

Utility vehicles of the pickup truck type having an open topped body or bed are widely used particularly in service and maintenance businesses for transporting tools, equipment, and materials. It is frequently desirable to provide a cover for the truck bed in order to protect the contents from the elements and a tarpaulin has commonly been used for this purpose. There are also instances where it is desirable to provide a readily accessible work space in the vehicle and an enclosure mounted on the truck bed has been used for this purpose. However, such an enclosure which necessarily is higher than the cab presents wind and stability problems when the vehicle is being driven and further inhibits rearward visibility.

It is therefore desirable to provide a top for an open vehicle body which may be raised and lowered between an upper position providing a work space, and a lower position closing the body. Canvas sides and a zipper-door may be provided for completing the closure when the top is in its upper position, and a pickup truck so-equipped also finds utility as a camper.

One such movable top construction for a pickup truck is shown in U.S. Pat. No. 3,649,073.

It is desirable that such a movable top be readily moved between its upper and lower positions by one person with minimal physical effort. It is further desirable that the mechanism by which the top is moved between its upper and lower positions occupy a minimum space and provide no obstruction on the floor area of the truck bed. Application Ser. No. 100,865 of the present applicant filed Dec. 23, 1970, and assigned to the assignee of the present application, discloses a parallel motion mechanism and the present invention employs modifications of that mechanism for raising and lowering the top.

SUMMARY OF THE INVENTION

In its broader aspects, the present invention provides a top for an open vehicle body, the top being movable between an upper position spaced above the body and a lower position forming an enclosure therewith. A pair of spaced extensible mechanisms are provided respectively interconnecting the body and the top for supporting the top and for moving the same between its upper and lower positions. Each of the mechanisms comprises a pair of spaced toggle linkages each having four link elements pivotally connected together at first and second opposite pivot points and at third and fourth opposite pivot points to form a parallelogram, the first pivot points being connected to the top and the second pivot points being connected to the body. Means are provided for interconnecting the third pivot points for movement in unison on an axis and for guiding the fourth pivot points for movement on the axis.

It is accordingly an object of the invention to provide an improved movable top assembly for an open vehicle body.

Another object of the invention is to provide an improved movable top assembly for an open vehicle body wherein the top is readily movable between upper and lower positions with minimum physical effort.

A further object of the invention is to provide an improved movable top assembly for an open vehicle body wherein the assembly utilizes an extensible mechanism occupying minimum space.

Yet another object of the invention is to provide an improved extensible mechanism.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a side cross-sectional view showing the extensible mechanism employed in the embodiment of FIG. 1;

FIG. 7 is the cross-sectional view taken generally along the line 7—7 of FIG. 3;

FIG. 8 is a side cross-sectional view showing another embodiment of the extensible mechanism of the invention;

FIG. 9 is a cross-sectional view taken generally along the line 9—9 of FIG. 8; and FIG. 10 is a cross-sectional view taken generally along the line of 10—10 of FIG. 8.

DESCRIPTION OF THE PREFERRED EMBODIMENT

Figure 1:
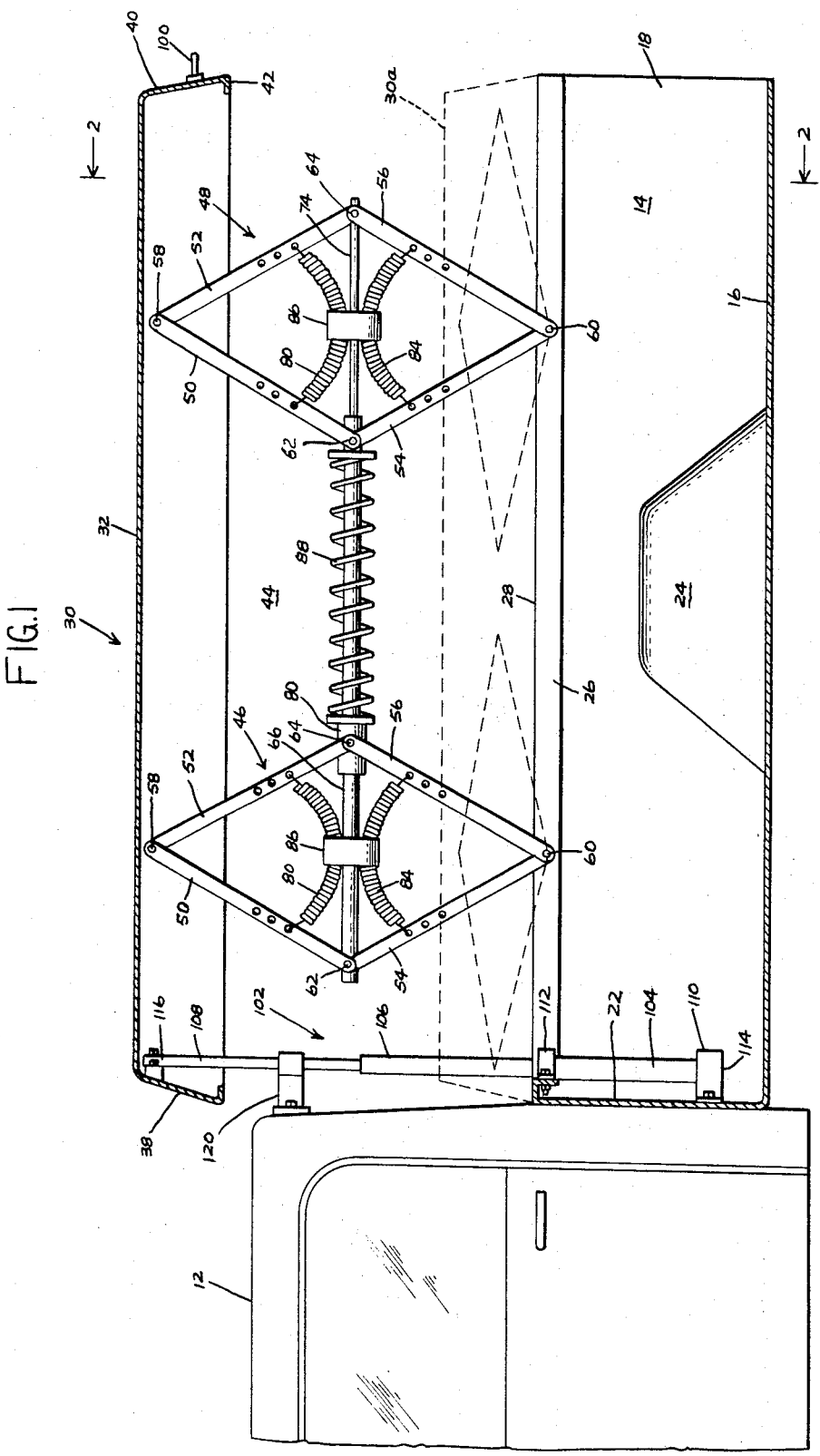
FIG. 1 is a side view of a pickup truck incorporating one embodiment of the invention.
Figure 2:
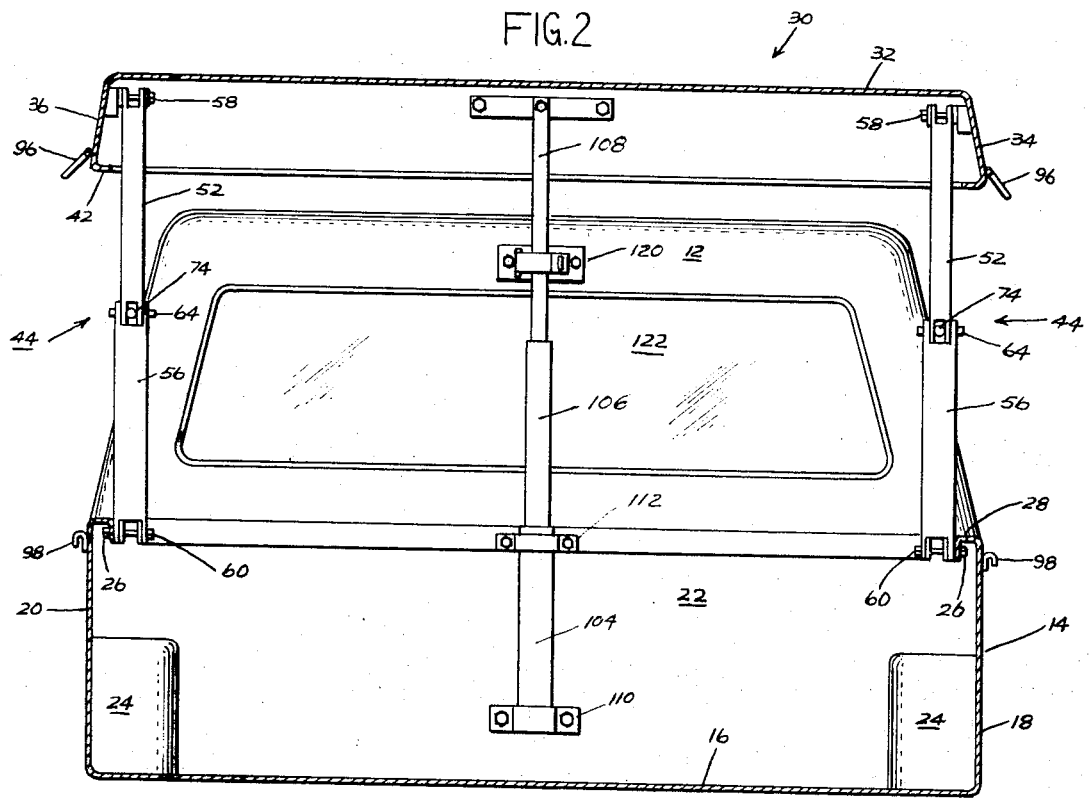
FIG. 2 is a cross-sectional view taken generally along the line 2—2 of FIG. 1.

Referring now to FIGS. 1 and 2 of the drawings, a conventional pickup truck is shown having cab 12 and an open-type body or bed 14. Body 14 has bottom or floor 16, spaced parallel side walls 18, 20, and front wall 22. Body 14 may also have a conventional tailgate (not shown). Wheel wells 24 extend into body 14 in conventional fashion, as shown. Side walls 18, 20 and front wall 22 have flange 26 which defines upper edge 28.

Top 30 is provided, formed of suitable relatively thin-walled sheet material such as metal or fiber glass. Top 30 comprises top wall 32 and opposite side and end walls 34, 36, 38, 40 each having an inturned flange 42. Top 30 complements the top opening of body 14 and in its lower position, as shown in dashed lines at 30a in FIG. 1, flange 42 on walls 34–40 engages top edge 28 on walls 18–22 of body 14 thereby forming an enclosure therewith.

Top 30 is supported and moved between its lower position 30a and its upper position, as shown in solid lines in FIGS. 1 and 2, by a pair of identical extensible mechanisms 44 respectively connected to flanges 26 of side walls 18, 20 of body 14 and to side walls 34, 36 of top 30, as will hereinafter be more fully described.

Referring now additionally to FIG. 3, each of the extensible mechanisms 44 comprises a pair of identical, spaced toggle linkages 46, 48. Each of the toggle linkages 46, 48 comprises four identical, channel-shaped link elements 50, 52, 54, 56. The outer ends of the pair of link elements 50, 52, are pivotally connected together by pivot pin 58 to form a first pivot point, and the outer ends of the other pair of link elements 54, 56 are pivotally connected together by pivot pin 60 to form a second pivot point. The inner ends of link elements 50, 54 are pivotally connected together to form a third pivot point 62, and the inner ends of link elements 52, 56 are pivotally connected together to form a fourth pivot point 64.

Figure 5:
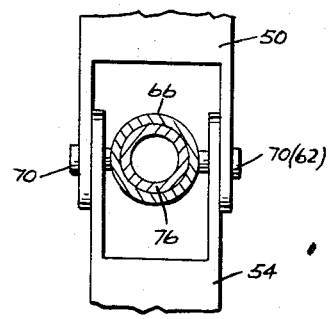
FIG. 5 is a cross-sectional view taken generally along the line 5—5 of FIG. 3.

The third pivot points 62 of linkages 46, 48 are interconnected by an elongated, rigid tube element 66. More particularly, pivot point 62 of linkage 46 comprises a pivot pin pivotally connecting the inner ends of link elements 50, 54 to each other and to tube 66 adjacent its end 68, while pivot point 62 of linkage 48 takes the form of two pivot pins 70 (FIG. 5) respectively secured to and extending outwardly from opposite sides of the tube 66 adjacent its end 72, pivot pins 70 respectively connecting link elements 50, 54 to each other and to tube 66.

Figure 4:
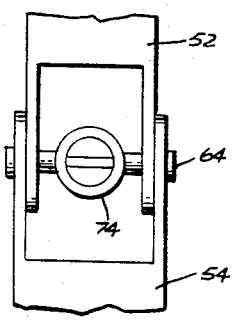
FIG. 4 is a fragmentary end view taken generally along the line 4—4 of FIG. 3.

A second elongated, rigid tube element 74 is provided having its end 76 telescopically received in end 72 of tube element 66. The fourth pivot point 64 of linkage 48 comprises a pivot pin pivotally connecting the inner ends of link elements 52, 56 to each other and to tube elements 7 adjacent its outer end 78 (FIG. 4).

Figure 6:
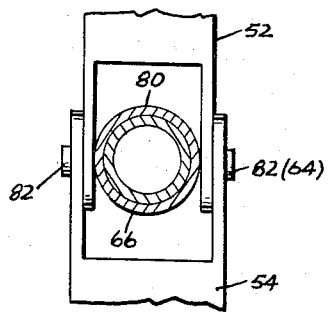
FIG. 6 is a cross-sectional view taken generally along the line 6—6 of FIG. 3.

Sleeve 80 is slidably received on tube element 66. The fourth pivot point 64 of linkage 46 comprises a pair of pivot pins 82 respectively secured to and extending outwardly from opposite sides of sleeve 80 and pivotally connecting the inner ends of link elements 52, 56 to each other and to sleeve 80 (FIG. 6).

Pivot pins 58 of each mechanism 44 which comprise the first pivot points are connected to the respective side wall 34, 36 of top 30 adjacent top wall 32, as shown. Pivot pins 60 of each mechanism 44 which comprise the second pivot points are connected to flange 26 of the respective side wall 18, 20, of body 14, as shown.

It will now be seen that as top 30 is raised upwardly from its lower position 30a, the third pivot points 62 of each mechanism 44 which are connected by the rigid tube element 66 will move to the right (as viewed in FIGS. 1 and 3) in unison, while the fourth pivot points 64 will be moved to the left by sleeve 80 sliding on tube 66 and by tube 74 telescoping within tube 66. This movement of the fourth pivot points 64 of each linkage 46, 48 is generally in unison thereby preserving the general parallel relationship of top 30 with top edge 28 of the side walls of body 14 however, the fact that the fourth pivot points 64 are not rigidly connected provides a sufficient amount of lost motion to accommodate a small amount of angularity between top 30 and top edge 28 of body 14. In particular, this lost motion permits lowering front end 38 of top 30 so that it engages top edge 28 of front wall 22 of body 14 while rear end 40 is spaced by a small amount from top edge 28 adjacent the rear ends of side walls 18, 20, and then further lowering rear end 40 into engagement with top edge 28 of the side walls in order to provide a tight seal.

In order to assist in raising top 30, a spring system is provided for biasing mechanisms 44 toward their extended positions. More particularly, an elongated coil spring 80 has its opposite ends selectively connected to selective spaced points 82 intermediate the opposite ends of the pair of link elements 50, 52 of each linkage 46, 48 and another elongated coil spring 84 similarly connects the other pair of link elements 54, 56 of each linkage. Springs 80, 84 of each linkage 46, 48 are clamped to the portion of the respective tube element 66, 74 which spans the respective third and fourth pivot points 62, 64, by a retainer member 86.

The provision of the plurality of holes 82 in link elements 50–56 to which the ends of coil springs 80, 84 are selectively attached permits adjustment of the springs so as to equalize movement of the opposite sides of top 30. Once the springs are properly adjusted, top 30 will move evenly in either direction even when body 14 is tilted, i.e., with one side higher than the other.

Another coil spring 88 may optionally be provided surrounding portion 90 of tube element 66 intermediate linkages 46, 48, spring 88 having its opposite ends engaging flange 92 on sleeve 80 and washer element 94 engaging the inner ends of link elements 50, 54 of linkage 48.

While springs 80, 84 serve primarily to counterbalance the weight of top 30, thereby permitting it readily to be moved between its upper and lower positions with a minimal effort, spring 88 requires top 30 to be forcibly moved downwardly for the last few inches of its travel and will kick top 30 upwardly thereby starting its upward travel when latches 96 which retain top 30 in its lower position are released from retaining hooks 98 (FIG. 2). It will be readily understood that both springs 80, 84, and springs 88 serve to bias mechanisms 44 toward their extended positions and that either springs 80, 84 or spring 88 may optionally be eliminated.

With only springs 80, 84 employed and connected so as to counterbalance the weight of top 30, top 30 will remain in any selected position between its upper and lower positions with only a slight amount of manual effort being required to move it upwardly or downwardly from the selected position. Handles 100 (FIG. 1) may be provided on top 30 to assist in moving it between its positions. The trapped air in body 14 provides a cushion as the top 30 approaches its lower position.

In order to guide top 30 for vertical movement between its upper and lower positions, and also to prevent sway of top 30 when it is above its lower position, telescoping brace assembly 102 is provided which, in the illustrated embodiment, comprises three telescoping sections 104, 106 and 108. Section 104 is secured to front wall 22 of body 14 by clamps 110, 112, bottom 114 of section 104 desirably being spaced above floor 16 so as not to obstruct the floor area. Upper end 116 of upper telescoping section 108 is secured to front wall 22 of top 30 in any suitable fashion. A suitable releasable clamp 120 mounted on the rear wall of cab 12 engages and stabilizes upper section 108 of telescoping brace assembly 102 when top 30 is in or close to its upper position.

Inspection of FIG. 2 will reveal that when top 30 is raised above the level of rear cab window 122, the only obstruction to window 122 is the narrow telescoping brace assembly 102. While telescoping brace assembly 102 has been shown as comprising three telescoping sections, it will readily be apparent that it may comprise four or more telescoping sections.

It will be seen that when top 30 is in its upper position, tube elements 66, 74 are spaced above top edge 28 of side walls 18, 20 of body 14 thus providing easy access to the truck bed from the sides. It will further be seen that the entire top assembly is connected to the body 14 by only four fasteners 60 at the four second pivot points. It will still further be observed by reference to FIG. 2 that mechanisms 44 occupy a minimum space and do not obstruct the floor area of body 14 at all.

Referring now to FIGS. 8, 9, and 10, in which like elements are indicated by like reference numerals and similar elements by primed reference numerals, an extensible mechanism 124 is shown bearing greater similarity to the parallel motion mechanism described and illustrated in the aforesaid application Ser. No. 100,865, mechanism 124 being suitable for use for raising and lowering top 30 in place of mechanism 44 of the previous figures.

Here, linkages 46 again comprise link elements 50-56 pivotally connected together at first and second opposite pivot points 58, 60. Elongated rigid tube element 66' interconnects third pivot point 62 of mechanism 46 and third pivot point 62' of mechanism 48. In this embodiment, a second elongated tube element 126 is telescopically received by tube element 66' and has the fourth pivot point 64' of linkage 46 and the fourth pivot point 64 of linkage 48 respectively connected to its opposite ends.

Tube element 66' has elongated slots 130 formed therein and tube element 126 has elongated slots 132 formed therein. In this embodiment, pivot point 64' of linkage 46 comprises a pivot pin pivotally connecting the inner ends of link elements 52, 56 to each other and to end 134 of tube element 126, pivot pin 64' extending through slot 130. Similarly, pivot point 62' of linkage 48 comprises a pivot pin pivotally connecting the inner ends of link elements 50, 54 to each other and to end 128 of tube element 66', pivot pin 62' extending through slots 132 in tube element 126. Thus, in this embodiment the fourth pivot points 64 of linkages 46, 48 are rigidly connected by tube 126 for movement in unison. With this construction, the slight lost motion of the embodiment of the previous figures is eliminated and top 30 will in all positions be maintained parallel with top edges 26 of side walls 18, 20 of body 14.

Coil springs 80, 84 are again provided selectively connected to holes 82 in the respective pairs of link elements 50, 52 and 54, 56 before biasing linkages 46, 48 to their extended positions thereby to counterbalance the weight of top 30. If desired, coil spring 88 of the previous embodiment may also be incorporated in similar fashion.

In a physical embodiment of the invention incorporating the extensible mechanism of FIGS. 8, 9 and 10 installed on a pickup truck having an 8-foot long bed, the total weight of the complete assembly including both mechanisms 124 and top 30 was less than 50 pounds. In that embodiment, each mechanism 124 when fully retracted was 7½ feet long, 5 inches high and 1½ inches thick, thus occupying only a very small part of the volume of the truck bed. When fully extended, a 31 inch spacing is provided between bottom edge 42 of top 30 and top edge 28 of side walls 18, 20 of body 14, the total height between floor 16 of body 14 and top wall 32 of top 30 being 63 inches.

It will now be seen that the invention provides a top for an open bodied vehical which is movable between upper and lower positions with minimum physical effort, the top in its upper position providing a stand-up work space and in its lower position enclosing the truck bed. It will further be seen that the extensible mechanism which movably supports the top occupies minimum space and provides minimal obstruction in both its fully extended and fully retracted positions, and that the entire movable top assembly is readily installed on and removed from the truck body.

While there have been described above the principles of this invention in connection with specific apparatus, it is to be clearly understood that this description is made only by way of example and not as a limitation to the scope of the invention.

I claim:

1. In a vehicle having an open body, a top movable between an upper position spaced above said body and a lower position forming an enclosure therewith, and a pair of spaced extensible mechanisms respectively interconnecting said body and said top for supporting said top and for moving the same between said positions thereof, each of said mechanisms comprising a pair of spaced toggle linkages; each of said linkages comprising four link elements pivotally connected together at first and second opposite pivot points and at third and fourth opposite pivot points to form a parallelogram, means for connecting said first pivot points to said top and means for connecting said second pivot points to said body, means interconnecting said third pivot points in a predetermined fixedly spaced relation for movement in unison on an axis, and means for guiding said fourth pivot points for movement along said axis, each of said linkages comprising a first pair of said link elements connected by said first pivot point and a second pair of link elements connected by said second pivot point, and at least one spring connecting a respective pair of link elements for biasing the same to move said top toward its upper position.

2. The vehicle of claim 1 wherein said interconnecting means comprises a first elongated, rigid element, said third pivot points being respectively connected to said first element adjacent the opposite ends thereof, said first element having a portion spanning said third and fourth pivot points of one of said linkages, said guiding means including a second elongated, rigid element mounted on said first element for relative lateral movement thereon, the fourth pivot point of the other of said linkages being connected to said second element adjacent one end thereof, said second element having a portion spanning said third and fourth pivot points of said other linkage, each of said springs being an elongated coil spring having its opposite ends connected to the respective pair of link elements intermediate their ends, each of said linkages further comprising means for clamping said spring intermediate its ends to the spanning portion of the respective elongated element.

3. The vehicle of claim 1 wherein each of said springs has its opposite ends respectively selectively connected to the respective pair of link elements at a plurality of points.

4. The vehicle of claim 1 wherein each of said linkages comprises two of said springs respectively connecting said first and second pairs of link elements.

* * * * *